(12) United States Patent
Mansfield

(10) Patent No.: US 6,556,825 B1
(45) Date of Patent: Apr. 29, 2003

(54) METHOD AND APPARATUS FOR AUTOMATIC ADAPTATION OF COMMUNICATIONS SYSTEMS TO REGIONAL SPECTRUM VARIATIONS

(75) Inventor: Carl Mansfield, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/499,896

(22) Filed: Feb. 8, 2000

(51) Int. Cl.[7] ................................................. H04Q 7/20
(52) U.S. Cl. ......................... 455/422; 455/62; 455/575
(58) Field of Search .......................... 455/62, 422, 426, 455/446, 448, 449, 454, 90, 575, 95

(56) References Cited

U.S. PATENT DOCUMENTS

| | | | |
|---|---|---|---|
| 5,729,680 A | 3/1998 | Belanger et al. | |
| 5,838,730 A | 11/1998 | Cripps | |
| 5,867,766 A | 2/1999 | Dinc et al. | |
| 5,881,372 A | 3/1999 | Kruys | |
| 5,896,375 A * | 4/1999 | Dent et al. | 370/347 |
| 5,926,501 A * | 7/1999 | Souissi et al. | 375/200 |
| 5,937,348 A * | 8/1999 | Cina et al. | 455/421 |
| 6,028,853 A * | 2/2000 | Haartsen | 370/338 |
| 6,300,881 B1 * | 10/2001 | Yee et al. | 340/870.02 |
| 6,366,622 B1 * | 4/2002 | Brown et al. | 375/322 |
| 2001/0027098 A1 * | 10/2001 | Suzuki | 455/415 |

* cited by examiner

Primary Examiner—Thanh Cong Le
Assistant Examiner—Thuan T. Nguyen
(74) Attorney, Agent, or Firm—Robert D. Varitz, P.C.

(57) ABSTRACT

A method of configuring an RF transceiver to receive a geographic-region specific message within a RF signal from a communications network, includes detecting the geographic-region specific message in a first RF transceiver operating in a first RF frequency spectrum; associating the detected geographic-region specific RF signal with a geographic region; generating a configuration command signal for the geographic region; and configuring a second RF transceiver to receive and transmit RF signals in a second RF frequency spectrum particular to the geographic region from the configuration command signal. A system for configuring an RF transceiver for use with a communications network, wherein the network includes transmitters which transmit a geographic-region specific message unique to the geographic region in which the transmitter is located, includes a mobile appliance having plural RF transceivers therein, including a first RF transceiver operating in a first RF frequency spectrum and a second RF transceiver operating in a second RF frequency spectrum, wherein the first RF transceiver receives the geographic-region specific message from a transmitter; a configuration mechanism for receiving the geographic-region specific message from the first transceiver, generating a configuration command signal, and transmitting the configuration command signal to the second RF transceiver; wherein the second RF transceiver, upon receipt of the configuration command signal, changes an associated RF configuration to operate in the second RF frequency spectrum associated with the geographic region.

14 Claims, 1 Drawing Sheet

METHOD AND APPARATUS FOR AUTOMATIC ADAPTATION OF COMMUNICATIONS SYSTEMS TO REGIONAL SPECTRUM VARIATIONS

FIELD OF THE INVENTION

This invention relates to wireless communication for mobile communications and computing appliances, and specifically to devices which incorporate both cellular communications capability, for wide area, mobile connectivity, and industrial, scientific and medical (ISM) band RF communications connectivity, for short range, mostly indoor connectivity, such as a cellular-personal digital assistant (PDA), or cell phone.

BACKGROUND OF THE INVENTION

The industrial, scientific and medical (ISM) RF band, at 2.4 GHz, permits non-licensed operation of wireless communication devices, subject to certain constraints in terms of transmit power, modulation and bandwidth. Although the ISM band is broadly available worldwide, there are regional variations in the spectrum available, due to the existence of legacy RF systems in this band in certain countries. Specifically, France uses significantly less of the ISM band than do the rest of Europe and the United States of America. Although Japan now uses the same ISM frequency band as the United States of America and Europe, certain portions of that country still use a different spectrum of the ISM band, beginning and ending higher in the 2.4 GHz spectrum. The allowed bands for non-licensed operation are as follows:

| | |
|---|---|
| USA & Americas: | 2.400–2.4835 GHz |
| Most of Europe: | 2.400–2.4835 GHz |
| France: | 2.4465–2.4835 GHz |
| Japan: | 2.471–2.497 GHz (in some portions of the country only) |

A number of new and existing communications systems are designed to operate in these non-licensed bands. Some examples are:

802.11 This is a wireless IEEE standard and protocol for use with LAN systems, designed as a wireless replacement for office LAN communications. It comes in both Direct Sequence (DS) and Frequency Hopping (FH) variants both operating in the 2.4 GHz ISM bands. Variation of this standard are identified as 802.11a and 802.11b. 802.11b is an unlicensed national information infrastructure (UNII) protocol and operates in the 5 GHz band.

HomeRF This is a new wireless ISM band protocol for Shared Wireless Access Protocol—SWAP-CA Cordless Access, which specification is just undergoing completion. It is intended to provide cordless communications for voice and data for home networking applications, particularly for multimedia applications.

Bluetooth™ Bluetooth™ is a new short-range communications standard, designed for operation in the 2.4 GHz ISM band. Bluetooth™ is intended primarily as a replacement for cables, providing connectivity over a short range between, for example, a PDA and Laptop or a Laptop and Cellular Phone. Bluetooth™ is an RF alternative for IrDA connectivity. Bluetooth™ is a trademark/service mark of Telefonaktiebolaget LM Ericsson, of Stockholm, Sweden for telecommunication equipment, computer communication equipment, including radio modems; and telecommunication and computer communication services.

Each of these protocols is constrained to operate within the allowed regulations of the non-licensed ISM band, which regulations vary according to the country of operation. The specifications of these systems define the frequencies of operation and allowable carrier frequencies and further define how the protocols differ between France, Japan, the USA and the rest of Europe.

In order to support the movement of portable equipment between different countries, which have differing ISM band allocations, it is necessary for an ISM band communications module in a device to be configured to the appropriate country in which the device is being operated. This is necessary to comply with national regulatory schemes and to avoid interference with other devices operating in the same portion of the ISM spectrum in a particular country or geographical region. For example, in moving a Bluetooth™-enabled device from the USA to France, the country_code within the Bluetooth™ module must be reconfigured from the USA RF spectrum to the French RF spectrum, to avoid interference from devices operating in the USA ISM spectrum and outside of the French ISM spectrum. Reconfiguration is also required to avoid violating French regulations for non-licensed RF devices.

In most cases, such reconfiguration requires the user to manually alter the device configuration for a specific country using some kind of driver software. Some devices may be hard-configured to comply with the non-licensed frequency spectrum in only a single country, or geographical region, and are not capable of being re-configured. It is desirable, however, for an ISM band communications device to automatically configure itself to the RF spectrum of the country in which it is located, without user intervention.

ISM systems have historically not needed to roam between different regulatory regions, as they have traditionally been part of a fixed wireless system, such as a LAN. They are configured to function with the local RF spectrum, generally upon initial activation, by manual user intervention, e.g., configuration of device driver options.

Licensed, wide area cellular systems have provided automatic regional configuration to local spectrum variations by supporting multi-band terminals and/or subscriber identification module (SIM) roaming. This requires redundant hardware, such as a new terminal for SIM roaming, or additional RF hardware for multi-band terminals. SIM roaming requires manual intervention i.e., insertion of the SIM into a new terminal, in order to function. Multi-band devices adapt to the local band by scanning possible frequencies to detect the frequency of transmission of the local cell-sites. Prior art in non-licensed technology is either permanently configured to one country's regulation or requires manual reconfiguration to change to a new country.

U.S. Pat. No. 5,729,680, to Belanger et al., granted Mar. 17, 1998, for Ad hoc initialization for wireless local area network, describes a method for bootstrapping unlicensed band communications devices from cold start, so that they are able to communicate, but does not teach or suggest a system or method for adapting to different geographic spectral differences.

U.S. Pat. No. 5,838,730, to Cripps, granted Nov. 17, 1998, for Radio transmitted/receiver for wireless local area network, describes a system which complies to the non-licensed band regulations of the United States of America.

U.S. Pat. No. 5,867,766, to Dinc et al., granted Feb. 2, 1999, for Technique for performing an automatic channel search and switch during talk-time in mobile transceivers, describes a system incorporating a single RF module, which configures its transmission frequencies by measuring the locally used transmission frequencies.

U.S. Pat. No. 5,881,372, to Kruys, granted Mar. 9, 1999, for Radio Communication Device and Method, describes a system which forces the radio module to only use the set of frequencies which are common globally and denies operation in any frequency which is not available in every country. This restricts the performance because only a small subset of channel frequencies are available globally in the ISM band.

The prior art in the ISM device field does not provide such an automatic configuration capability, in which information from a regulated/licensed wide area wireless technology, such as GSM, is used to configure a short-range, non-regulated wireless module in order to meet local frequency band variations in the non-licensed band.

SUMMARY OF THE INVENTION

A method of configuring an RF transceiver to receive a geographic-region specific message within a RF signal from a communications network, includes detecting the geographic-region specific message in a first RF transceiver operating in a first RF frequency spectrum; associating the detected geographic-region specific RF signal with a geographic region; generating a configuration command signal for the geographic region; and configuring a second RF transceiver to receive and transmits RF signals in a second RF frequency spectrum particular to the geographic region from the configuration command signal. A system for configuring an RF transceiver for use with a communications network, wherein the network includes transmitters which transmit a geographic-region specific message unique to the geographic region in which the transmitter is located, includes a mobile appliance having plural RF transceivers therein, including a first RF transceiver operating in a first RF frequency spectrum and a second RF transceiver operating in a second RF frequency spectrum, wherein the first RF transceiver receives the geographic-region specific message from a transmitter; a configuration mechanism for receiving the geographic-region specific message from the first transceiver, generating a configuration command signal, and transmitting the configuration. command signal to the second RF transceiver; wherein the second RF transceiver, upon receipt of the configuration command signal, changes an associated RF configuration to operate in the second RF frequency spectrum associated with the geographic region.

It is an object of the invention to provide automatic configuration of an non-licensed band RF module to local variations in allocation of the non-licensed RF spectrum, without user intervention.

Another object of the invention is to provide an ISM device which uses the country code broadcast information in a geographic region to reconfigure device RF capability to accommodate region specific messages.

These and other objects and advantages of the invention will become more fully apparent as the description which follows is read in conjunction with the drawings.

DETAILED DESCRIPTION OF THE PREFERRED EMBODIMENTS

This invention provides a method and an apparatus for a cellular communications or computing device, which also incorporate an industrial, scientific and medical (ISM) non-licensed, RF band communications module, to adjust the ISM module to geographic differences in the ISM spectrum. An example of a device which may incorporate the invention is a cellular telephone that includes a Bluetooth™ capability to provide connectivity between a cell phone and, for example, a laptop, PC, PDA or cordless headset.

Figure 1:
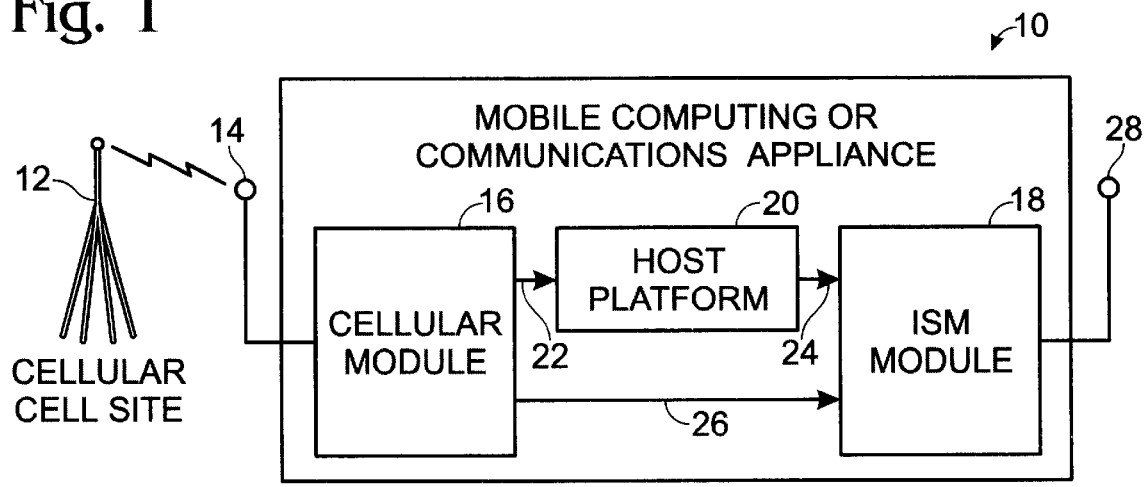
FIG. 1 is a block diagram of a communications network incorporating the system of the invention.

Such a device, known as a mobile computing or communications appliance (MCCA), is shown generally at 10 in FIG. 1. MCCA 10 is depicted in communications with a communications network, including a cellular cell-site 12. Cell-site 12, or transmitter, periodically transmits a geographic-region specific message, which geographic-region specific message is unique to the geographic region in which transmitter 12 is located. At the present time, for purposes of the system and method of the invention, some examples of geographic regions, which are divided along regulatory differences for the frequency spectrum of non-licensed equipment, are the United States of America, France, Europe except France, and portions of Japan. MCCA 10 includes an antenna 14, and at least one cellular communications module, or first RF transceiver, 16, and at least one ISM band, short-range communications module or second RF transceiver, 18. Cellular module 16 operates in a first RF frequency spectrum, generally in the 900 MHz, 1800 MHz or 1900 MHz range, while ISM module 18 operates in a second RF frequency spectrum, i.e., the 2.4 GHz band. As previously noted, this second RF frequency spectrum differs between geographic regions, however, each geographic region has a geographic-region specific RF signal transmitted by cell-site 12 associated therewith. Device 10 may also include a third component relating to the computing or other capabilities of the device, referred to as a host platform, or configuration means, 20. Host platform 20 may be, for example, an embedded computing platform providing PDA functions. Note that not all embodiments of this invention necessarily include a host platform. For example, in the case of a cellular telephone, the cellular communications module performs the host function for the ISM band communications module, and host platform 20 is considered a part of cellular module 16. ISM, or non-licensed, band signals leaving MCCA 10 do so through antenna 28, which may be combined with antenna 14 in certain embodiments of the invention.

The cellular system, e.g., global system for mobile communications (GSM) as illustrated in FIG. 1, provides wide area connectivity for the MCCA. Cellular module 16 receives broadcast system information from cellular cell-site 12, e.g., a GSM base station, which includes information related to the location of the cell-site, including its country code. The country code identifies a geographic region in which the device is operating. In the case of GSM, for example, the country code is included in the location area identifier (LAI) which is transmitted regularly on the cell's broadcast channel (BCCH channel in GSM).

When registered on the wide area cellular system, cellular module 16 in MCCA 10 regularly receives the country code of cell-site 12, which is also the country in which the MCCA 10 is currently located. Every time a country code for cellular cell-site 12 is received by cellular module 16, module 16 checks that country code against the previous cell-site country code which is stored in memory within cellular module 16.

Figure 2:
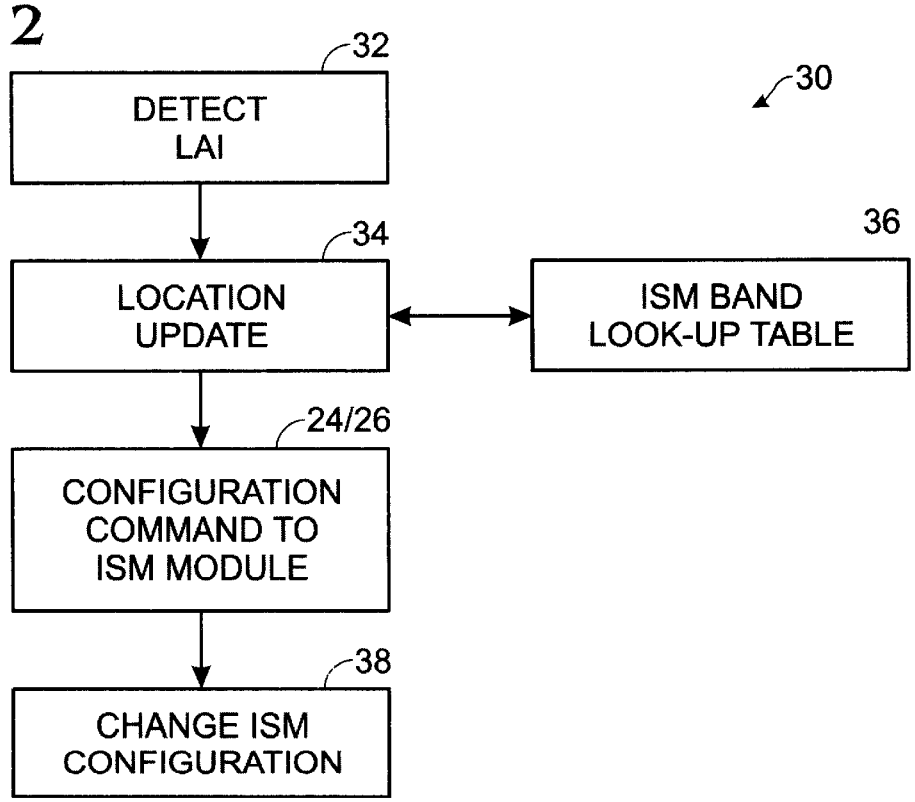
FIG. 2 is a flow chart depicting the method of the invention.

The method of the invention is depicted in FIG. 2, generally at 30. Referring now to FIGS. 1 and 2, if the country code has changed, meaning that MCCA 10 has roamed to a new country, and if MCCA 10 includes host 20, a message 22 is passed to host platform 20, identifying the country in which MCCA 10 is now located. It should be noted that, at least for GSM, this process includes looking for changes in the geographic-region specific message, or location area identifier (LAI) 32, a procedure already performed by cellular module 16 as part of the location update 34 mobility management process: a change in country code always implies a change of location area, requiring appliance 10 to perform a location update. A change in location area, however, does not necessarily imply a change in country code, nor does a change in location mean that the device has moved into a new geographic region.

Host platform 20 checks a look-up table 36 to see if the new country, i.e., geographic region, requires reconfiguration of ISM band communications module 18 to ensure compliance with local regulations in the ISM band, thereby associating the geographic-region specific ISM band RF signal with the geographic region. If reconfiguration is required, host platform 20 generates and sends a configuration command signal, or message, 24 to ISM module 18 changing its country code configuration 38 to the new value. This allows the ISM module to automatically be updated to the required ISM band regulations of the country in which MCCA 10 is located, without user intervention.

In another embodiment, if MCCA 10 does not include a separate host platform, cellular module 16 performs the look-up operation 36 to see if the country code of ISM module 18 needs to be reconfigured. If so, cellular module 16 sends a configuration command message 26 directly to ISM module 18, updating the ISM module to ensure operation in the ISM band in accordance with the local regulatory requirements. Even if a host platform is present in the MCCA, the cellular module may still perform the look-up operation and directly configure the ISM module without the intervention of the host platform.

Other embodiments of MCCA 10 include combining cellular module 16 with ISM module 18 into a single, multi-frequency module, and using a single antenna; combining modules 16 and 18 with host platform 20, and using a single antenna; and any combination of modules 16, 18 and platform 20, with a single antenna.

The specific design of the look-up table is not provided, as the structure of such a look-up table is well within the abilities of one of ordinary skill in the art. An example of system operation is:

1. MCCA 10 moves from France to Germany.
2. Cellular module 16 detects the change in country 32 from France to Germany due to the change in the country code received in the cellular broadcast channel. Cellular module 16 performs a location update 34, as necessary.
3. Host platform 20 is informed of the new country and compares Germany to France, the previous country, in its lookup table 36.
4. Because Germany and France have different ISM band regulation, as indicated by look-up process 36, host platform 20. sends a message 24/26 to ISM module 18 changing the configuration 38 of the ISM module to conform to the ISM band regulations for Germany.

The preferred embodiment of this invention is a cell phone, or cellular enabled PDA, such as a Sharp model MC-G1 PDC Personal Mobile Communicator, which includes both cellular communications capability and an ISM communications module. Cellular communications is used to provide connectivity to wide area, mobile voice and data communications, while ISM band devices provide short range connectivity and communications capability. Thus, a user of a cellular and ISM band device constructed according to the invention may take a laptop and PDA, which normally operate in, for instance, the United States of America, to France or Japan and know that the devices will operate on the correct non-licensed frequencies for those geographic regions, and know that the devices will be able to exchange information without interference from devices operating in the ISM band spectrum which are not part of the designated spectrum for the particular geographic region.

The invention is most useful in 3G cellular voice and multimedia terminals, that incorporate Bluetooth™ as a short-range cable replacement technology. Alternative embodiments which are natural examples of this invention include: devices employing an alternate ISM technology to Bluetooth™, e.g., SWAP-CA or 802.11, alternate device types, e.g., a cordless Web-Pad which employs both HomeRF SWAP-CA for in-home connectivity and 3G for wide area connectivity. Although GSM is the cellular system used to illustrate the invention, the invention is useful in any cellular system which includes country codes somewhere in the broadcast control channel.

The invention has significant advantages over known systems and methods of changing an ISM module configuration. The invention provides automatic configuration of an non-licensed band RF module to local variations in allocation of non-licensed spectrum, without user intervention. The prior art in the non-licensed RF technology is either permanently configured to one region's regulation or requires manual reconfiguration by a user to change to a new region.

The invention uses location information from a licensed, wide area cellular system to configure a short-range, non-licensed RF band module to the local frequency spectrum. No existing system configures RF technology in this manner, e.g., using information from a system operating in one frequency spectrum to reconfigure a system operating in another frequency spectrum. The prior art in this field performs RF reconfiguration using information from the same system as the one being reconfigured, e.g., multi-band GSM terminals scan to find the infrastructure's transmit frequency to automatically reconfigure transmission/reception protocols.

Although a preferred embodiment of the invention, and several variations thereof have been disclosed, it will be appreciated that further variations and modifications may be made thereto without departing from the scope of the invention as defined in the appended claims.

I claim:

1. A method of configuring an RF transceiver in a multi-spectrum communications appliance moving between geographic regions to operate in a geographic-region specific ISM frequency from a received geographic-region specific message within a RF signal from a communications network, comprising:

detecting the geographic-region specific message in a first RF transceiver operating in a first RF frequency spectrum;

associating the detected geographic-region specific RF signal with a geographic region;

generating a configuration command signal for the geographic region; and configuring a second RF transceiver in the communications appliance to receive and transmit RF signals in a second RF frequency spectrum particular to the geographic region from the configuration command signal.

2. The method of claim 1 wherein said associating includes searching a look-up table for a geographic region.

3. The method of claim 1 which includes performing said associating and said generating in the first RF transceiver.

4. A system for configuring a multi-spectrum RF transceiver for use with a communications network, wherein the network includes transmitters which transmit a geographic-region specific message unique to the geographic region in which the transmitter is located, the system comprising:

a mobile appliance having plural RF transceivers therein, including a first RF transceiver operating in a cellular frequency spectrum and a second RF transceiver operating in a ISM frequency spectrum, wherein said first RF transceiver receives the geographic-region specific message from a transmitter;

configurations means for receiving the geographic-region specific message from said first transceiver, generating a configuration command signal, and transmitting said configuration command signal to said second RF transceiver;

wherein said second RF transceiver, upon receipt of said configuration command signal, changes an associated RF configuration to operate in the ISM frequency spectrum associated with the geographic region.

5. The system of claim 4 wherein said configuration means is located in said first RF transceiver.

6. The system of claim 4 which further includes a host platform, and wherein said configuration means is located in said host platform.

7. The system of claim 6 wherein said first transceiver, said second transceiver and said host platform are located in a single, multi-frequency transceiver.

8. The system of claim 4 wherein said configuration means includes a look-up table for associating a geographic-region specific message with a geographic region.

9. The system of claim 4 wherein said first transceiver and said second transceiver are located in a single, multi-band transceiver.

10. The system of claim 4 which includes an antenna for said first transceiver and which further includes another antenna for said second transceiver.

11. The system of claim 4 which includes a single antenna which is operably connected to said first transceiver and to said second transceiver.

12. A method of configuring an RF transceiver in a multi-spectrum communications appliance moving between geographic regions to operate in a geographic-region specific ISM frequency from a received geographic-region specific message within a RF signal from a communications network, comprising:

detecting the geographic-region specific message in a first RF transceiver operating in a cellular RF frequency spectrum;

associating the detected geographic-region specific RF signal with a geographic region;

generating a configuration command signal for the geographic region; and configuring a second RF transceiver in the communications appliance to receive and transmit RF signals in a ISM frequency spectrum particular to the geographic region from the configuration command signal.

13. The method of claim 12 wherein said associating includes searching a look-up table for a geographic region.

14. The method of claim 12 which includes performing said associating and said generating in the first RF transceiver.

* * * * *